United States Patent [19]

Dalnekoff et al.

[11] Patent Number: 4,931,932
[45] Date of Patent: Jun. 5, 1990

[54] COMPUTERIZED SYSTEM WITH MEANS TO AUTOMATICALLY CLEAR AND SELL WAIT-LISTED CUSTOMER RESERVATIONS

[75] Inventors: Stanley Dalnekoff; Michael L. Schneider, both of New Haven, Conn.

[73] Assignee: Travelsoft, Inc., New Haven, Conn.

[21] Appl. No.: 101,973

[22] Filed: Sep. 28, 1987

[51] Int. Cl.$^5$ .............................................. G06F 15/26
[52] U.S. Cl. ...................................... 364/407; 364/400
[58] Field of Search ................ 364/401, 408, 400, 407

[56] References Cited

U.S. PATENT DOCUMENTS

| | | |
|---|---|---|
| 2,542,890 | 2/1951 | Basu et al. . |
| 2,883,106 | 4/1959 | Cornwell et al. . |
| 2,910,238 | 10/1959 | Miles ..................................... 364/401 |
| 2,995,729 | 8/1961 | Steele . |
| 3,750,103 | 7/1973 | Angus et al. . |
| 4,412,287 | 10/1983 | Braddock ............................. 364/408 |
| 4,449,186 | 5/1984 | Kelly et al. . |

FOREIGN PATENT DOCUMENTS 0146360  8/1985  Japan .................................... 364/407
233769  11/1985  Japan .

OTHER PUBLICATIONS

G. D. Dubey et al, "Data Communication Network for Air-India and Indian Airline", J. Instn. Electronics & Telecom. Engrs., vol. 24, Nos. 3 & 4, Mar.-Apr. 1978.

Primary Examiner—Jerry Smith
Assistant Examiner—Gail D. Hayes
Attorney, Agent, or Firm—Bachman & LaPointe

[57] ABSTRACT

The present invention relates to an electronic inventory clearing system having particular utility as an airline reservation system. The system includes one or more devices for storing information from which transactions can be generated, at least one transaction forwarding and storage station for requesting a desired transaction and an information processing unit for evaluating requested items with respect to the stored information. The information processing unit is capable of compiling a list of uncompleted transactions and of automatically querying the information storage device(s) for the availability of items to fill each transaction on the list. A process for using the system is also described.

19 Claims, 1 Drawing Sheet

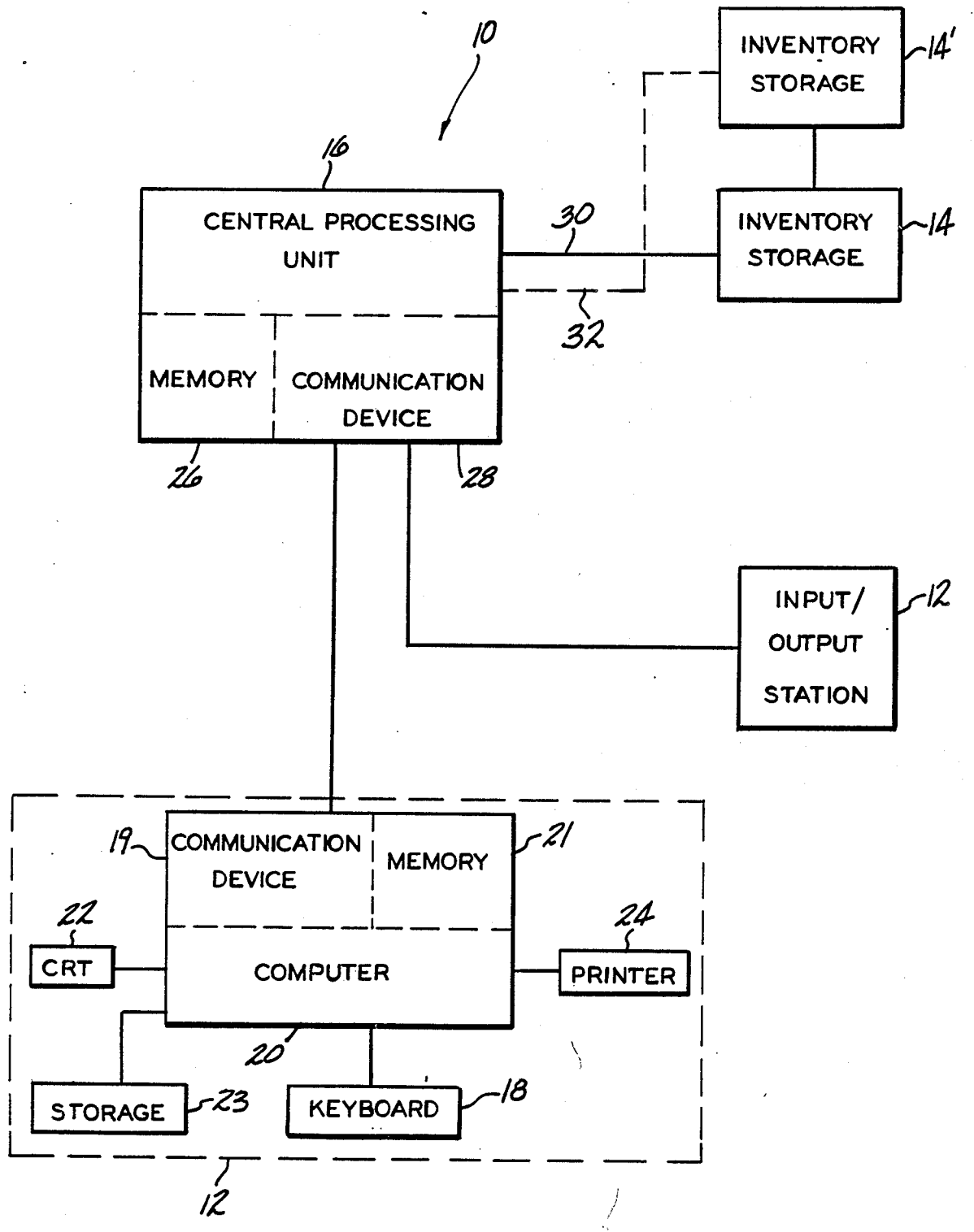

COMPUTERIZED SYSTEM WITH MEANS TO AUTOMATICALLY CLEAR AND SELL WAIT-LISTED CUSTOMER RESERVATIONS

BACKGROUND OF THE INVENTION

The present invention relates to an electronic inventory clearance system which has utility as a system for electronically buying and selling items. The system has particular utility as a reservation system for travel accommodations such as airline reservations.

Systems employing high speed electronic digital computers are especially useful for rapid and reliable processing of business data. Over the years, numerous systems utilizing computers of various sorts have been developed for use in the transportation industry. U.S. Pat. No. 2,542,890 to Basu et al. illustrates one rudimentary system. The system includes a master station which communicates with one or more remote booking panels. To make a reservation or check on availability, an operator at a remote booking panel presses a button corresponding to a particular flight on a particular date and receives an indication of seat availability. The operator by pressing other buttons or switches can either book a seat on a flight or cancel a reservation.

U.S. Pat. No. 2,883,106 to Cornwell et al. shows yet another early reservation system for travel accommodations. In this system, a central station is used to maintain an inventory and one or more remote units are used to scan the inventory to locate a desired accommodation and to make a reservation if such an accommodation is found. The system also allows an agent to locate a record of a reservation and effect a sale or cancellation of that reservation. One of the particular deficiencies of this system is the lack of an efficient mechanism for handling wait-listed items, particularly when access to the central station is unavailable. With this system, a list must be clerically kept. In addition, intervention by a master agent is required to clear a wait-listed item.

U.S. Pat. No. 2,995,729 to Steele illustrates an electronic digital inventory computer which also has utility in a passenger reservation system. The system includes a central processing unit for storing information about an inventory and one or more input devices for communicating with the central processing unit to place an order. Here again, there is no effective mechanism for processing wait-listed items.

More recently, electronic systems for issuing tickets and/or boarding passes to passengers have been developed. These systems employ modern digital computers and have plural input/output terminals tied to a master computer. U.S. Pat. Nos. 3,750,103 to Angus et al. and U.S. Pat. No. 4,449,186 to Kelly et al. exemplify these systems.

Most travel agencies today utilize a single primary or host reservation system to make and sell airline reservations and seats. The agent utilizes a computer to request a seat or reservation on a specific flight. Often, requests are not filled because communication with the reservation system's computer is impossible or seats in a desired class or on a desired flight are unavailable. These unfilled requests are often placed on a wait-list within the reservation system or in the event of computer related malfunctions kept manually. Problems arise both in clearing items already wait-listed and adding new requests when access to the reservation system becomes available. For example, when a previously unavailable computer in the system becomes available, a person must manually enter, reserve and confirm the reservation. After doing this, the requested reservation may not be available, and it may have to be wait-listed for later action.

When seats do become available, either by cancellation or additional allocation, airline reservation systems in use today do not automatically clear wait-listed reservations. It is usually the responsibility of the agent to review the status of a reservation and sell a wait-listed seat when it becomes available. The problem is further exacerbated in that most host systems are controlled by a particular airline. In these systems, seat inventory is controlled by controlling the number of discount seats on a daily basis. The airline(s) sponsoring the host system use this control and the allocation of seats to their own and other reservation systems or co-host systems as a method of obtaining a competitive advantage over other airlines. With the large number of agents trying to sell wait-listed seats, the probability of a successful sale becomes lower as the volatility of seats and number of agents increase.

It is believed that most travel agents would welcome a system which collects requests when an airline's reservation computer is unavailable or when requested items are unavailable, stores a list of these inventory requests, subsequently automatically uses this collected information to query one or more master reservation systems regarding item availability, and after finding an item meeting predefined criteria automatically sells the item in the name of an individual. As yet, such a system is not in commercial operation or commercially available.

Accordingly, it is an object of the present invention to provide an electronic inventory clearance system and process having particular utility as an airline reservation system as well as utility in other applications where reservations or items are sold via computer interaction.

It is a further object of the present invention to provide a system and process as above which requires minimal operator intervention in clearing wait-listed reservations or items.

It is still a further object of the present invention to provide a system and process as above which is capable of performing both traditional and non-traditional booking, buying and/or selling techniques.

These and other objects and advantages will become more apparent from the following description and drawings.

SUMMARY OF THE PRESENT INVENTION

The foregoing objects and advantages are achieved by the electronic inventory clearance system of the present invention which comprise means for inputting or generating an inventory of computer transactions; means for storing said inventory of transactions; means for extracting and/or requesting a particular transaction; means for evaluating the result of the requested transaction to determine whether the results were successful or unsuccessful; said evaluating means including means for compiling and storing an inventory of requested transactions which require further action and means for continuously and automatically presenting these transactions in the inventory to an information storage means until either at least one transaction in the inventory has been successfully performed or an operator of the system stops the search. The system further includes means for notifying a user of the system that a previously unsuccessful transaction has been successfully completed.

In one embodiment, the system includes one or more stations for communicating with an inventory storage system. Each station may be used to input inventory requests and receive information relating to a requested transaction. Each station preferably comprises one or more computers, one or more visual display means and one or more keyboards for requesting an inventory transaction having predefined criteria such as a seat in a particular class on a particular flight on a particular date. Each station further has means for compiling and storing an inventory of requested transactions which have not been completed for automatic processing. Still further, each station includes an output module which preferably comprises at least one alphanumeric printer for issuing indicia of a completed inventory transaction, visual display means for displaying the status of requested inventory transactions and/or means for storing a list of completed or uncompleted inventory transactions.

The system of the present invention operates as follows. A user or requester uses an input device to request a particular inventory transaction. If access is available, the request is compared with the available items in the inventory storage system. If the requested transaction is available, a sale of the requested inventory item is effected and an output module receives instructions to print out a ticket or to store a reservation of the item within one of the computers for later sale. At the same time, the status of the sold/reserved item is changed from available to unavailable in the inventory storage system. If the requested transaction cannot be completed either for lack of item availability or lack of access to the inventory storage system, the user has the option to add the requested action to a list compiled within a unit for compiling and storing an inventory of requested inventory actions. This stored list of inventory requests is then automatically presented to means for querying the inventory storage system regarding item availability. After finding an item which meets the predefined criteria of the request transaction, a sale or reservation depending upon the request is automatically made. At this point, the system may automatically notify the user that a sale has been made or may store information about the sale or request for later retrieval by the user. The search or querying operation continues automatically until either one or more items in the inventory storage system are sold or an operator intervenes. As can be seen from the foregoing, the system of the present invention is designed to operate in an automatic mode with minimal intervention by operators and users.

BRIEF DESCRIPTION OF THE DRAWINGS

The FIGURE is a schematic representation of an electronic inventory clearance system in accordance with the present invention.

DETAILED DESCRIPTION

While the present invention will be described in the context of an airline reservation system, it should be recognized that its potential uses extend to all applications where reservations are made, items are bought and sold via computer interaction, or transactions are presented to a computer system. Thus, the system could be used in the entertainment industry to sell or reserve theatre tickets. It could also be used by the cable TV industry for in-home merchandising of products and services. Still further, it could be used for buying and selling financial instruments or equities. In addition, it could store transactions to a computer data base. It could also be used to request the initiation or termination of a process controlled by a computer. The present invention is intended to cover all such applications.

Referring now to the drawing, the electronic inventory clearance system 10 includes one or more transaction forwarding and storage stations 12 which function as input/output stations, an inventory storage system or data base comprising one or more devices 14, 14' for storing an inventory of items to be sold, and a central processing unit 16. The stations 12 may be located at a site or sites remote from the inventory storage system such as in a travel agent's office. . Alternatively, the stations 12 may be located on-site with the inventory storage system. Still further, the inventory storage device(s) 14, 14' may be located either at the same location as the central processing unit 16 or at a remote location(s).

Each station 12 has an input portion which comprises at least one keyboard 18 for entering the details of a request, at least one information processing unit 20, and at least one video display device 22 such as a CRT display. Through the keyboard 18, a user or requester such as a travel agent may define the criteria for a requested transaction, i.e. date(s) of travel, point of origin, destination, routing, particular flights, class of service, number of seats, location of seats, etc. including options and contingencies.

Each station 12 also has an output portion which includes the information processing unit(s) 20, the video display device(s) 22 and at least one printer 24. The printer(s) 24 may be used to issue indicia of a completed transaction such as a ticket, a confirmation of a reservation, and/or an itinerary. The printer(s) could also be used to provide an operator with a report about the status of each request item awaiting action and/or the sale of such items.

The stations 12 may further include one or more storage devices 23. The storage devices 23 may comprise any suitable means known in the art such as a tape storage device, a hard disk, and/or a floppy disk. The device(s) 23 may be used to store an inventory of items to be bought, sold, or otherwise manipulated, an inventory of transactions to be completed, as well as any other desired information or records.

The inventory storage device(s) 14, 14' may comprise any suitable means known in the art for storing data about an inventory of items including the availability or unavailability of such items. For example, each storage device could be a computer with a hard disk memory and/or a tape storage device with appropriate read/write heads. In the context of an airline reservation system, one device 14 may be a host reservation system and the other device 14' may be a second host reservation system or a co-host reservation system which can be accessed by the first host reservation system.

The central processing unit 16 and the information processing unit 20 each may comprise any special or general purpose computer known in the art including micro-computers. Each one may be programmed to carry out the aims of the present invention or may contain suitable circuitry to do the same. Each unit ideally complies with the following considerations--have sufficient capacity to run the program, sufficient storage capacity 21, 26 to compile and store a list or inventory of as yet uncompleted inventory transactions, a removable data storage device not shown such as a tape or disk for backup, and means 19, 28 for communicating or interfacing with respective ones of the stations 12 and the inventory storage devices 14, 14'. The communication means for each unit may comprise any suitable communication link or device known in the art such as a modem. Each memory storage 21, 26 is preferably capable of storing information on different media and in different formats.

In operation, the information processing unit 20 is the heart of the system. It receives requests from a user and through suitable programming and/or circuitry evaluates the requested transaction to determine if it can be successfully or unsuccessfully completed. If a requested inventory item is available, the unit 20 may effect a sale of the item or make a reservation thereof. At the same time, the unit 20 may instruct the unit 16 to change the status of the item within the storage device(s) 14, 14' from available to unavailable.

The unit 20 may also be used to generate an inventory of computer transactions and to either immediately process the transactions or store the inventory for later processing. The unit 20 may store the inventory in its memory 21 and/or in storage device 23. Later the unit 20 may be used to extract a particular transaction or transactions from the inventory for further processing. For example, if a requested inventory item is unavailable or if the unit 20 cannot for any reason access the inventory storage system, the processing unit 20 at the request of the user may store the unfilled request in its memory 21 and/or storage 23. By doing this, a list of inventory requests, commands or transactions to be completed can be compiled.

After a list or inventory of requests or transactions has been generated or compiled, the unit 20 through its programming and/or circuitry may be used to continuously and automatically query an inventory storage system about the availability of requested items or the transactions on the list. This search or query function may continue until one or more items in the inventory have been sold or an operator intervenes and stops the search function. When a previously uncompleted transaction is completed such as the sale of a wait-listed seat, the processing unit 20 automatically clears it from the list of requests.

One of the advantages of the present system is that it is capable of notifying a requester of a sale of a wait-listed request. Notification can be accomplished in one of several ways. For example, the processing unit 20 could cause a ticket to be issued using the printer 24 or, a display could appear on a video display device 22. Alternatively, the record of the sale may be retained in the memory 21 or storage 23 for later retrieval by the requester.

As previously discussed, the inventory storage system may include more than one inventory storage device 14, 14'. Access to each device may be obtained through lines 30 and 32 and central processing unit 16. The unit 16 may be provided with appropriate programming or circuitry to switch from one system to the other as desired, i.e. when there are no items left in a system to fill requests. One of the advantages attendant to this configuration in the context of airline reservations is that a user could identify more or all available seats for a given flight on an airline other than the one sponsoring the host system. As previously stated, one only obtains information about a relatively small number of seats on airlines other than the sponsoring airline when one enters a co-host system through a host system. Another advantage is that each inventOry storage device could be simultaneously searched for item availability. The unit 16 may be configured to access each system 14, 14' either concurrently or sequentially. Alternatively, the system 0 could be used in the standard manner, i.e. a single host reservation system and thus, enter a co-host system through the primary or host reservation system.

While the inventory storage device(s) 14, 14' are normally separate and remote from the central processing unit 16, they may individually or collectively be part of the central processing unit 16 if so desired.

While it is preferred to store the list of inventory requests in memory 21 and use unit 20 to query the inventory storage system, the list of inventory requests could be stored in either memory 26 or storage 23, and the query function could be performed by central processing unit 16. In this regard, the central processing unit 16 and/or its communication device 28 may be used to initiate or terminate the querying function.

While the inventory storage devices 14, 14' may be accessed by unit 20 via central processing unit 16, the unit 16 could also be eliminated and the unit 20 could be Provided with direct access to each storage device 14, 14'.

The system 10 is further desirable in that it may be used for non-conventional reservation booking techniques. For example, the system may be used to define a set of standard itineraries which are then stored in either the memory 26 of the central processing unit or the memory 21 of the unit 20. To make reservations and/or sell seats in this mode, the agent inputs the name of the person taking the trip and the appropriate dates of travel and the unit 16 or 20 conforms the request to the standard itineraries. Alternatively, the unit 20 could be used to formulate a request in accordance with predefined criteria and then query the inventory storage system about the availability of the requested item.

The system may also be used for non-traditional booking methods such as: (1) off-line interfaces for high volume transactions; (2) off-line interfaces for non-travel professionals; (3) off-line interfaces which are part of other office automation systems; or (4) expert systems and other heuristic or non-heuristic methods for determining optimal routing.

One of the advantages of the present invention is that the system allows a user to compile a list of requests before accessing the inventory storage system. Significant cost benefits can be obtained by accessing the inventory storage system only after the list has been compiled instead of repeatedly logging on/off to handle each individual request.

It is apparent that there has been provided in accordance with this invention an airline reservation system which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A reservation system for use by travel agents which electronically and automatically clears travel requests and which comprises:
  means for communicating with a storage device storing an inventory of seats on a particular mode of transportation, said seats being categorized as unavailable if sold or reserved and being categorized as available if unsold or unreserved;
  said inventory of seats being changeable as a result of cancellation and non-cancellation events;
  said communicating means including means for enabling at least one agent to request a desired seat on a desired mode of transportation by specifying a desired set of criteria;
  means for evaluating the seat request to determine the availability of the desired seat and for providing an indication to said at least one agent of a completed transaction if said requested seat is in said available category and of a non-completed transaction if said requested seat is in said unavailable category;
  means for compiling and storing a set of wait-listed requests comprising a plurality of said non-completed transactions; and
  said communicating means further including means for automatically clearing and selling said wait-listed seat requests without further intervention of said at least one agent by continuously and automatically querying said changeable seat inventory in said storage device about each said wait-listed request and re-evaluating each said wait-listed request until each said wait-listed request is filled.

2. A system as set forth in claim 19 where said evaluating means further includes means for notifying said agent of said successful transaction when said system finds an available seat conforming to said requested seat and for removing said seat request from said set of wait-listed seat requests.

3. A system as set forth in claim 2 wherein said notifying means automatically notifies said agent without any action on the part of said agent.

4. A system as set forth in claim 2 which further comprises at least one of a printer for providing indicia of said completed transaction and a device for displaying visual indicia of said completed transaction.

5. A system as set forth in claim 2 wherein said evaluating means has at least one storage device associated therewith for storing information relating to transactions.

6. A system as set forth in claim 19 wherein said list compiling and storing means forms part of said evaluating means.

7. A system as set forth in claim 2 wherein said evaluating means comprises at least one information processing unit having memory storage and communications capability.

8. A system as set forth in claim 7 wherein said enabling means comprises a plurality of input stations.

9. A system as set forth in claim 8 wherein each said input station has at least one said information processing unit, at least one manual input device and at least one visual display device.

10. A system according to claim 1 wherein said communication means further includes means for enabling an operator to issue instructions to said system to halt further processing of said wait-listed requests.

11. A process for electronically and automatically clearing travel requests which comprises:
  communicating with at least one storage device for storing an inventory of seats on a particular mode of transportation, said seats being categorized as unavailable if sold or reserved and being categorized as available if unsold or unreserved;
  said inventory of seats being changeable as a result of cancellation and non-cancellation events;
  said communicating step comprising requesting a desired seat on a desired mode of transportation by specifying a desired set of criteria;
  evaluating the seat request to determine the availability of the desired seat;
  providing an indication to an agent of a completed transaction if the requested seat is in the available category and a non-completed transaction if the requested seat is in the unavailable category;
  compiling and storing a set of wait-listed seat requests comprising a plurality of said non-completed transactions; and
  said communicating step further comprising automatically clearing and selling said wait-listed seat requests without further intervention of the agent by continuously and automatically querying said inventory in said at least one storage device about each said wait-listed request and re-evaluating each said wait-listed request until each said wait-listed request is filled.

12. A process as in claim 21 further comprising halting said querying step as a result of an operator issuing instruction to stop said querying.

13. A process as in claim 21 wherein said indication providing step further comprises notifying said agent of the completion of a previously uncompleted transaction.

14. A process as in claim 13 wherein said notifying step comprises automatically notifying said agent.

15. A process as in claim 13 wherein said notifying step comprises at least one of printing indicia of said completed transaction and visually displaying indicia of said completed transaction.

16. A process as in claim 13 wherein said notifying step comprises storing information relating to said completed transaction for later retrieval by said agent.

17. A process as in claim 11 further comprising:
  generating information about said inventory and storing generated information in said at least one storage device;
  using said generated information to form said seat request; and
  submitting said seat request to a computer for evaluation against information stored in a data base.

18. A process according to claim 11 further comprising automatically clearing a filled wait-listed requested from said set of wait-listed requests.

19. A process for electronically and automatically processing travel requests which comprises:
  communicating with at least one storage device for storing information about an inventory of seats on a particular mode of transportation;
  collecting a plurality of requests made by at least one requester about desired seats on said mode of transportation;
  storing said collected requests for later processing;
  said communicating step including continuously and automatically processing each said stored request by continuously and automatically querying said inventory; and
  notifying a requester about a particular one of said collected requests which is available in said inventory.

* * * * *

UNITED STATES PATENT AND TRADEMARK OFFICE
CERTIFICATE OF CORRECTION

PATENT NO. : 4,931,932

DATED : June 5, 1990

INVENTOR(S) : Stanley Dalnekoff et al.

It is certified that error appears in the above-identified patent and that said Letters Patent is hereby corrected as shown below:

In column 7, claim 2, line 32, change claim dependency from "19" to --1--.

In column 7, claim 2, line 32, "where" should read --wherein--.

In column 7, claim 6, line 49, change claim dependency from "19" to --1--.

In column 8, claim 12, line 26, change claim dependency from "21" to --11--.

In column 8, claim 13, line 29, change claim dependency from "21" to --11--.

In column 8, claim 17, line 43, after "storing" insert --said--.

In column 8, claim 18, line 51, "requested" should read --request--.

Signed and Sealed this

Sixteenth Day of July, 1991

Attest:

HARRY F. MANBECK, JR.

Attesting Officer

Commissioner of Patents and Trademarks